United States Patent
Watanabe et al.

(10) Patent No.: US 8,447,114 B2
(45) Date of Patent: May 21, 2013

(54) METHOD AND APPARATUS FOR CALCULATING PIXEL FEATURES OF IMAGE DATA

(75) Inventors: Tomoki Watanabe, Kanagawa (JP); Satoshi Ito, Kanagawa-ken (JP); Kentaro Yokoi, Kanagwa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 946 days.

(21) Appl. No.: 12/536,668

(22) Filed: Aug. 6, 2009

(65) Prior Publication Data

US 2010/0034465 A1 Feb. 11, 2010

(30) Foreign Application Priority Data

Aug. 8, 2008 (JP) ................................. 2008-206008

(51) Int. Cl.
*G06K 9/46* (2006.01)
*G06K 9/66* (2006.01)

(52) U.S. Cl.
USPC ............ 382/190; 382/159; 382/162; 382/169

(58) Field of Classification Search
USPC .................. 382/109, 159, 190, 162, 169, 276
See application file for complete search history.

(56) References Cited

U.S. PATENT DOCUMENTS

| 7,630,517 | B2 * | 12/2009 | Mirowski et al. | 382/109 |
| 7,949,186 | B2 * | 5/2011 | Grauman et al. | 382/170 |
| 8,059,891 | B2 * | 11/2011 | Li et al. | 382/162 |
| 2004/0234159 | A1 * | 11/2004 | Wang | 382/260 |
| 2005/0084154 | A1 * | 4/2005 | Li et al. | 382/190 |
| 2007/0014435 | A1 * | 1/2007 | Mirowski et al. | 382/109 |
| 2007/0143272 | A1 * | 6/2007 | Kobayashi | 707/3 |
| 2008/0285853 | A1 * | 11/2008 | Bressan | 382/169 |
| 2008/0310692 | A1 * | 12/2008 | Robinson et al. | 382/128 |
| 2009/0067747 | A1 * | 3/2009 | Inamoto et al. | 382/276 |
| 2010/0034465 | A1 * | 2/2010 | Watanabe et al. | 382/190 |
| 2012/0134556 | A1 * | 5/2012 | Kono et al. | 382/128 |

FOREIGN PATENT DOCUMENTS

JP 2000-207566 7/2000

OTHER PUBLICATIONS

Dalal, et al. Histograms of Oriented Gradients for Human Detection, CVPR 2005, vol. 1, pp. 886-893, 2005.
Rautkorpi, et al. A Novel Shape Feature for Image Classification and Retrieval, Proceedings of the International Conference on Image Analysis and Recognition, LNCS 3211, Part I, pp. 753-760, 2004.

* cited by examiner

*Primary Examiner* — Gregory M Desire
(74) *Attorney, Agent, or Firm* — Turocy & Watson, LLP (57) ABSTRACT

A feature extracting apparatus includes a pixel feature calculator that calculates a pixel feature for each pixel of image data; an area setting unit configured to set a plurality of areas in the image data; a coordinate mapping unit configured to map a first coordinate in one of the plurality of areas onto a second coordinate in at least one of the other plurality of areas; and a co-occurrence matrix calculator configured to calculate a co-occurrence matrix for each of the plurality of areas, the co-occurrence matrix being frequency of combinations of the pixel features at the first coordinate and the pixel feature at the second coordinates.

8 Claims, 5 Drawing Sheets

INPUT IMAGE

PIXEL FEATURE A

PIXEL FEATURE B

US 8,447,114 B2

METHOD AND APPARATUS FOR CALCULATING PIXEL FEATURES OF IMAGE DATA

CROSS-REFERENCE TO RELATED APPLICATIONS

This application is entitled to claim the benefit of priority based on Japanese Patent Application No. 2008-206008, filed on Aug. 8, 2008; the entire contents of which are incorporated herein by reference.

BACKGROUND OF THE INVENTION

1. Field of the Invention

The present invention relates to a feature extracting apparatus, a feature extracting method, an image processing apparatus, and a computer program for CALCULATING PIXEL FEATURES OF IMAGE.

2. Description of the Related Art

Techniques for extracting features of an image have conventionally been known. For example, a process of recognizing an object captured in an image includes two steps: extracting features from the image and recognizing the object using the extracted features. It is difficult to restore the information lost in the feature extracting process, which is previously performed, during the recognition process, which is subsequently performed. Thus, the feature extracting process, which is performed previously, is important to perform the recognition process properly.

A feature extracting method for recognizing human individuals and other objects in an image is disclosed by Navneet Dalal and Bill Triggs, "Histograms of oriented gradients for human detection," the Institute of Electrical and Electronics Engineers (IEEE) Computer Society Conference on Computer Vision and Pattern Recognition (CVPR) 2005, vol. 1, pp. 886-893, 2005, as an example of the feature extracting process. Dalal et al. discloses that the image is divided into a plurality of areas in a grid pattern so that the values of bins in a luminance gradient direction histogram calculated for each area are used as features.

JP-A 2000-207566 (KOKAI) and "A Novel Shape Feature for Image Classification and Retrieval" by Rami Rautkorpi and Jukka Iivarinen in Proceedings of the International Conference on Image Analysis and Recognition, Lecture Notes in Computer Science (LNCS) 3211, Part I, pages 753-760, Porto, Portugal, Sep. 29 to Oct. 1, 2004 disclose a feature extracting method used for classifying various types of texture images. According to JP-A 2000-207566 (KOKAI), a matrix (i.e., a co-occurrence matrix) is used as features. The matrix has elements comprises the number of combinations expressed as P(i, j), where "j" denotes a gray level of a point obtained as a result of a parallel translation, of a predetermined distance and in a predetermined direction, from a point within the image of which the gray level is "i". In texture images, because similar patterns repeatedly appear at regular distance intervals, the features expressing a co-occurrence of gray-level values in two points that are positioned away from each other by the distance of the regular interval are effective in the recognition of the texture. According to Rautkorpi et al., it is possible to extract a feature that is robust even in changes caused by, for example, illuminations, using a co-occurrence matrix of luminance gradient directions, instead of the gray-level values of the image.

According to Dalal et al., however, the feature is extracted for each of the areas that are divided and arranged in the form of a grid. Thus, each of the features reflects only the information in the corresponding area. To perform the recognition process properly, it is necessary to use not only local information but also global information that expresses relationships with distant areas.

In addition, according to JP-A 2000-207566 (KOKAI) and Rautkorpi et al., because the texture images are used as targets, a recognition process performed on an object that has few repeatedly-appearing patterns (e.g., a person) is not taken into consideration.

SUMMARY OF THE INVENTION

According to one aspect of the present invention, a feature extracting apparatus includes a pixel feature calculator that calculates a pixel feature for each pixel of image data; an area setting unit configured to set a plurality of areas in the image data; a coordinate mapping unit configured to map a first coordinate in one of the plurality of areas onto a second coordinate in at least one of the other plurality of areas; and a co-occurrence matrix calculator configured to calculate a co-occurrence matrix for each of the plurality of areas, the co-occurrence matrix being frequency of combinations of the pixel features at the first coordinate and the pixel feature at the second coordinates.

According to another aspect of the present invention, a computer-implemented feature extracting method includes calculating a pixel feature for each pixel of image data; setting a plurality of areas in the image data; mapping a first coordinate in one of the plurality of areas onto a second coordinate in at least one of the plurality of areas; and calculating a co-occurrence matrix for each of the plurality of areas, the co-occurrence matrix being frequency of combinations of the pixel feature at the first coordinate and the pixel feature at the second coordinate.

A computer program according to still another aspect of the present invention causes a computer to perform the method according to the present invention.

DETAILED DESCRIPTION OF THE INVENTION

Exemplary embodiments of the present invention will be explained with reference to the accompanying drawings.

First, a configuration of a feature extracting apparatus according to an embodiment of the present invention will be explained.

Figure 1:
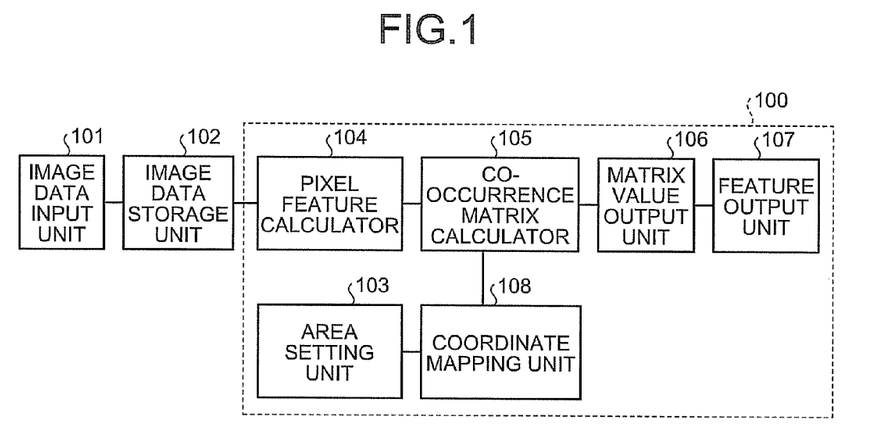
FIG. 1 shows a feature extracting apparatus according to an embodiment of the present invention.

FIG. 1 shows a feature extracting apparatus 100 according to the embodiment.

The feature extracting apparatus 100 includes an area setting unit 103, a coordinate mapping unit 108, a pixel feature calculator 104, a co-occurrence matrix calculator 105, a matrix value output unit 106, and a feature output unit 107. Further, the co-occurrence feature extracting apparatus 100 may be connected to an image data input unit 101 and an image data storage unit 102, as explained later.

The image data input unit 101 includes an imaging device such as an image sensor. Image data is obtained by the image data input unit 101. The image data storage unit 102 stores therein, for example, the image data obtained by the image data input unit 101.

The area setting unit 103 sets areas in the image data. It is preferable to have an arrangement, for example, so that the areas are positioned in the same manner among a plurality of pieces of image data. Another arrangement is also acceptable in which the areas are positioned so as to overlap one another.

The coordinate mapping unit 108 maps one or more coordinates included in the areas that have been set by the area setting unit 103 onto one or more other coordinates in the image data. For example, the coordinate mapping unit 108 performs the mapping process using an affine transformation. The affine transformation is a linear mapping process in which any of the following are combined: a parallel translation, a rotation, an inversion, an enlargement/reduction of the size, shearing, and so on.

The pixel feature calculator 104 calculates a pixel feature for each pixel of the image data stored in the image data storage unit 102. For example, the pixel feature calculator 104 calculates a value of the luminance gradient direction.

The co-occurrence matrix calculator 105 calculates a co-occurrence matrix of the pixel features between one or more pixels at the coordinate obtained as a result of the mapping process performed by the coordinate mapping unit 108 and the other one or more pixels at the coordinates before the mapping process. The matrix value output unit 106 outputs values of the elements in the co-occurrence matrix that has been calculated by the co-occurrence matrix calculator 105 via the feature output unit 107, as the co-occurrence feature of the image data that has been input.

Figure 2A:
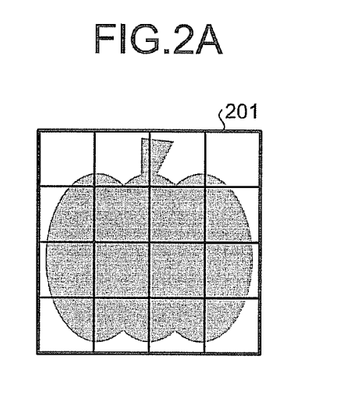
FIGS. 2A and 2B show exemplary methods for setting areas.
Figure 2B:
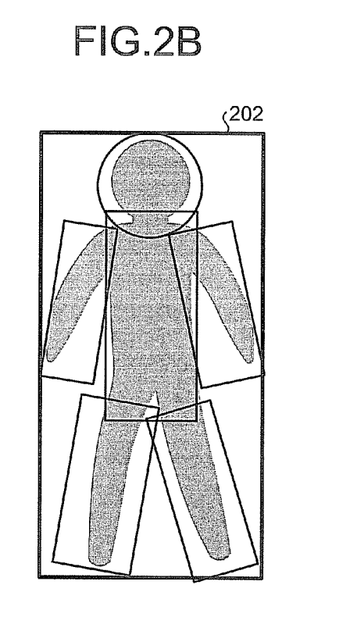

FIGS. 2A and 2B show an exemplary arrangement of areas. In FIG. 2A, it is shown that areas are set in an image 201 at regular intervals in the form of a grid. In FIG. 2B, it is shown that areas are set in an image 202 using previous knowledge about the shape of the recognition target. In the case where the object is a person, the previous knowledge is, for example, information indicating that the object has sections such as a head, a trunk, arms, legs, and the like. The areas do not necessarily have to be rectangular. The areas may be in any arbitrary shape such as circles.

Figure 3A:
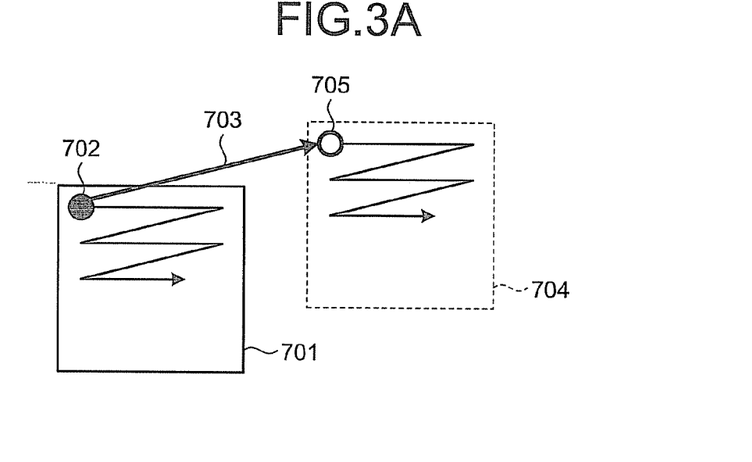
FIGS. 3A-3C show exemplary coordinate maps.
Figure 3B:
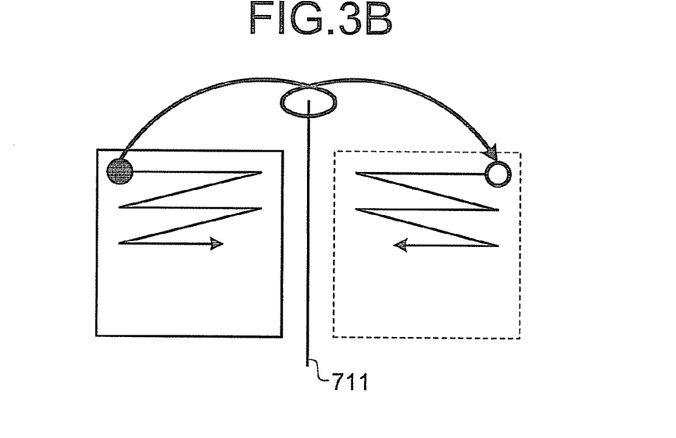
Figure 3C:
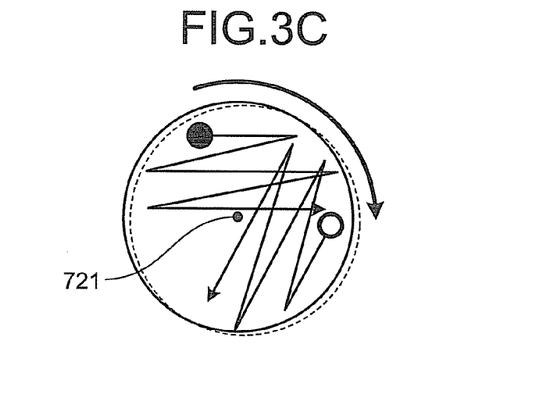

FIGS. 3A, 3B, and 3C show exemplary coordinate maps. FIG. 3A is a drawing for explaining a map that uses a parallel translation. As shown in FIG. 3A, the coordinates on the inside of an area 701 are mapped onto the inside of an area shown with a dotted-line rectangle 704, as a result of a displacement indicated with an arrow 703. In FIG. 3A, a black dot 702 and a white dot 705 indicate examples of representative coordinates before the mapping process and after the mapping process, respectively.

FIG. 3B is a drawing for explaining a map that uses a symmetric transformation. A line segment 711 is a part of the straight line used as an axis of the symmetric transformation. By performing the mapping process that uses the symmetric transformation and obtaining a co-occurrence matrix, it is possible to obtain pixel features that express whether the object has symmetricity with respect to the line segment. FIG. 3C is a drawing for explaining a map that uses a rotational transformation. A point 721 is the point used as the center of the rotational transformation. By performing the mapping process that uses the rotational transformation and obtaining a co-occurrence matrix, it is possible to obtain pixel features that express whether the object has invariability over the rotation.

Figure 4A:
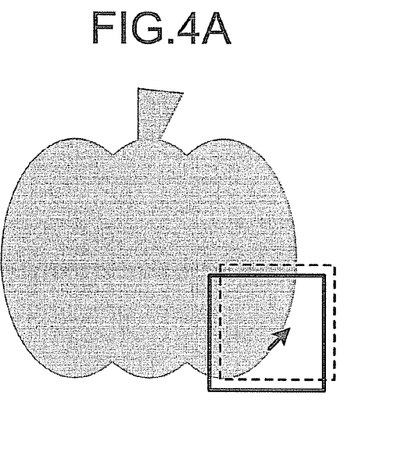
FIGS. 4A-4D show images to each of which a mapping process has been applied.

FIGS. 4A, 4B, 4C, and 4D show a mapping process applied to an image. FIG. 4A is a drawing for explaining an example of a map in which the distance of the parallel translation is short. With the map in which the distance of the parallel translation is short, it is possible to express local features such as a continuous edge shape or the like by calculating a co-occurrence matrix.

Figure 4B:
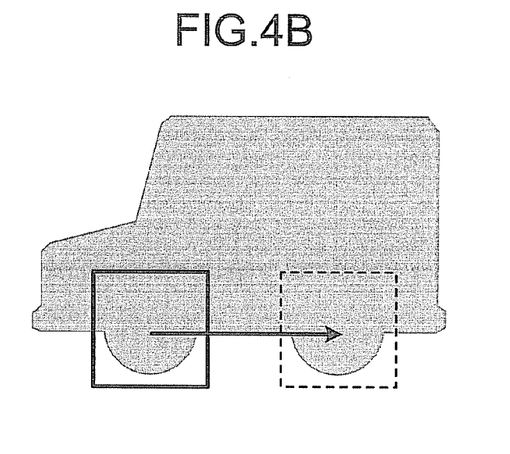

FIG. 4B is a drawing for explaining an example of a map in which the distance of the parallel translation is long. With the map in which the distance of the parallel translation is long, it is possible to express global features such as similarity in shapes within an object (e.g., two tires of an automobile) by calculating a co-occurrence matrix.

Figure 4C:
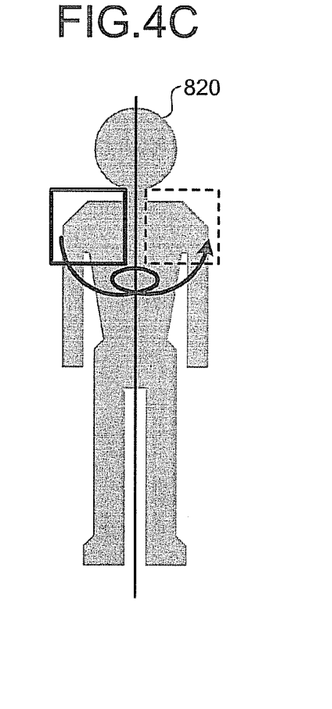

FIG. 4C is a drawing for explaining an example in which a mapping process that uses a symmetric transformation has been applied. Symmetric transformations may also be called "inversion". In the example shown in FIG. 4C, it is possible to express whether a person 820 has symmetricity, using the symmetric transformation explained above with reference to FIG. 3B.

Figure 4D:
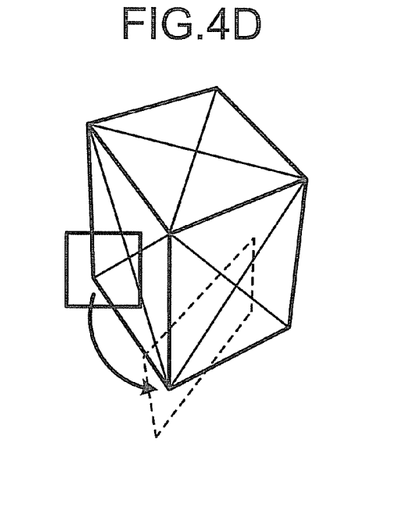

FIG. 4D is a drawing for explaining an example in which a non-linear mapping process has been applied. The non-linear mapping process is, for example, a mapping process that uses a projection transformation onto, for example, a plane, a sphere, or a circular cylinder. By performing the non-linear mapping process shown in FIG. 4D, it is possible to perform the mapping process onto a similar area.

The mapping processes explained with reference to FIGS. 3A, 3B, 3C, 4A, 4B, 4C, and 4D may be performed individually or in combination. For example, a parallel translation and a rotational transformation may be performed together in combination.

In the case where the computational cost of the functions used in the mapping process is high, another arrangement is acceptable in which a mapping process is performed using a table that shows the coordinates before and after the mapping process or the differences of the coordinates, instead of performing the calculations with the use of the functions in each mapping process.

Each of the pixel features that are calculated by the pixel feature calculator 104 is, for example, the magnitude or the direction of the luminance gradient, the luminance value, an output value of a filter, an ID according to a texton classification method, or the like. Examples of the filter include a Gaussian filter, a Sobel filter, a Laplacian filter, and a median filter.

As for the pixel features, it is preferable to obtain one or more values for each pixel or for each group of a number of pixels. Also, in the case where the input image data represents a multi-channel image such as a color image having three values corresponding to R (Red), G (Green), and B (Blue) in each pixel, each of the pixel features may be calculated from a value of one channel. Alternatively, each of the pixel features may be calculated from values of all the channels. To calculate the pixel features, it is also acceptable to use, for example, an image that is not a visible-light image (e.g., an infrared image) in one of the channels.

For example, the pixel feature calculator 104 may calculate the pixel features in a plurality of stages. More specifically, for example, the pixel feature calculator 104 may calculate the direction of the luminance gradient from an image to which a Gaussian filter has been applied.

The co-occurrence matrix calculated by the co-occurrence matrix calculator 105 is calculated for the area that has been set by the area setting unit 103.

The co-occurrence matrix is a matrix having the number of combinations expressed as Pf(i, j) as the elements thereof, where "i" denotes the pixel feature of a pixel that has been calculated by the pixel feature calculator 104, whereas "j" denotes the pixel feature at the coordinates that have been brought into correspondence with the pixel in a mapping process f performed by the coordinate mapping unit 108. An example of the co-occurrence matrix is shown in Expression (1) below:

$$\begin{bmatrix} P_f(0,0) & P_f(1,0) & \ldots & \ldots & P_f(i,0) & \ldots \\ P_f(0,1) & P_f(1,1) & & & & \\ \vdots & & \ddots & & & \\ \vdots & & & \ddots & & \\ P_f(0,j) & & & & P_f(i,j) & \\ \vdots & & & & & \ddots \end{bmatrix} \quad (1)$$

Figure 5:
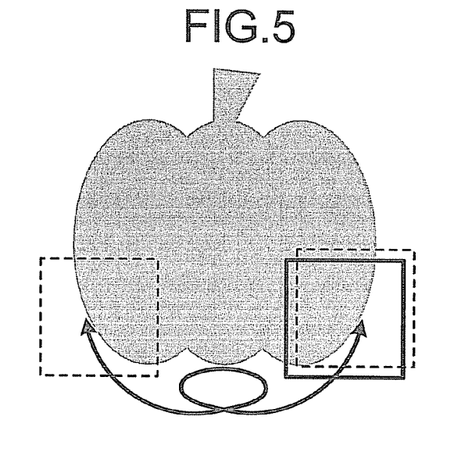
FIG. 5 shows exemplary mapping processes which are performed based on one area.

FIG. 5 shows exemplary mutually different mapping processes performed on one area by the coordinate mapping unit 108. When the mapping processes as shown in FIG. 5 have been performed, the co-occurrence matrix indicates, for example, a co-occurrence among three pixels that are namely a pixel in the area before the mapping processes and the pixels in the two areas after the mapping processes.

For instance, an example which uses a set of the two types of mapping processes F={f1, f2} will be explained. In this situation, f1 and f2 are mutually different mapping processes, each from a pixel before the mapping process to a pixel after the mapping process. Hereinafter, these mapping processes will be referred to as a first mapping process and a second mapping process. In this situation, the co-occurrence matrix calculated by the co-occurrence matrix calculator 105 is a three-dimensional matrix (i.e. a three-dimensional array) having PF(i, j, k) as the elements thereof. In the present example, "i", "j", and "k" denote, a pixel feature of the pixel before the mapping process, a pixel feature of the pixel after the first mapping process, and a pixel feature of the pixel after the second mapping process, respectively.

Figure 6:
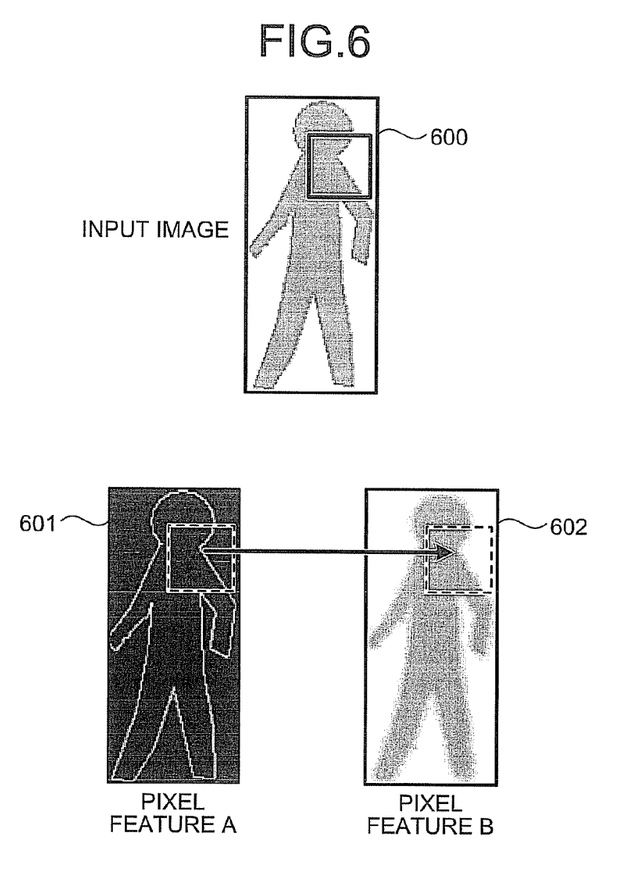
FIG. 6 shows an exemplary calculation of a co-occurrence matrix using two different types of pixel features.

FIG. 6 shows an exemplary process for calculating a co-occurrence matrix based on different pixel features. In the example shown in FIG. 6, the pixel feature calculator 104 calculates two mutually different sets of pixel features from an input image 600. Data 601 and data 602 visualize the two types of pixel features (pixel feature A pixel and feature B), which are calculated from the input image 600 by pixel feature calculator 104. In this situation, the co-occurrence matrix calculator 105 may calculate a co-occurrence matrix between the input image 600 and the pixel features A or between the input image 600 and the pixel features B. Alternatively, the co-occurrence matrix calculator 105 may calculate, for example, a co-occurrence matrix between the pixel features A and the pixel features B.

In each of the elements Pf(i, j) of the co-occurrence matrix obtained based on the two sets of pixel features (i.e., the pixel features A and the pixel features B), "i" denotes a value in the pixel features A, whereas "j" denotes a value in the pixel features B. Alternatively, another arrangement is acceptable in which the co-occurrence matrix calculator 105 expresses a plurality of pixel features corresponding to each of the pixels using vectors and calculates a co-occurrence of the vectors. In this situation, "i" and "j" in Pf(i, j) are a vector having values in the pixel features A as the elements thereof and a vector having values in the pixel features B as the elements thereof, respectively.

To perform a process of recognizing an object based on the co-occurrence matrix obtained as the pixel features, it is acceptable to use a classifier such as a support vector machine, a boosting method, a k-nearest neighbor classifier, a Bayes classifier, a neural network, or the like.

Figure 7:
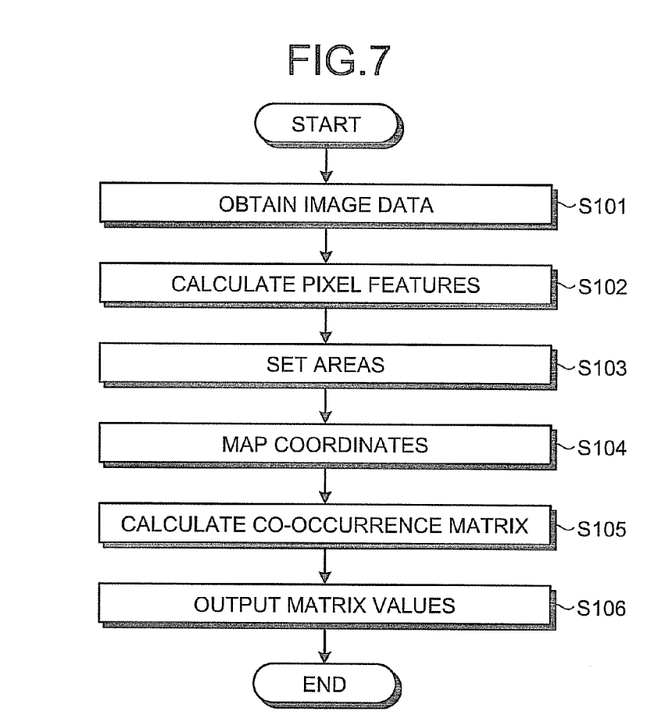
FIG. 7 is a flowchart of a feature extracting method according to an embodiment of the present invention.

FIG. 7 is a flowchart of a process for calculating the co-occurrence feature of an image according to the present embodiment. In the example shown in FIG. 7, areas are set in image data that has been input so that a co-occurrence matrix of pixel features for each of the areas is calculated as the co-occurrence feature of the image data that has been input.

At step S101, the image data input unit 101 obtains image data. An arrangement is preferable in which the obtained image data is stored into the image data storage unit 102.

At step S102, the pixel feature calculator 104 calculates a pixel feature for each of the pixels in the image data.

At step S103, the area setting unit 103 sets a plurality of areas in the image data.

At step S104, the coordinate mapping unit 108 maps the coordinates in one of the areas that have been set at step S103 onto coordinates in one or more other areas, using a predetermined mapping process.

At step S105, the co-occurrence matrix calculator 105 calculates a co-occurrence matrix. The co-occurrence matrix is calculated between the pixel features of the pixels in the area set at step S103 and the pixel features of the pixels at the coordinates that have been obtained by mapping those pixels at step S104. For example, in the case where a plurality of mapping processes have been performed at step S104, another arrangement is acceptable in which the co-occurrence matrix is calculated between the pixels obtained after the plurality of mutually different processes have been performed. Further, in the case where a plurality of pixel features have been calculated at step S102, yet another arrangement is acceptable in which the co-occurrence matrix is calculated between the plurality of mutually different pixel features.

At step S106, the matrix value output unit 106 calculates matrix values of the co-occurrence matrix that has been calculated at step S105. The matrix values are output to the feature output unit 107 as the co-occurrence feature of the image data.

Figure 8:
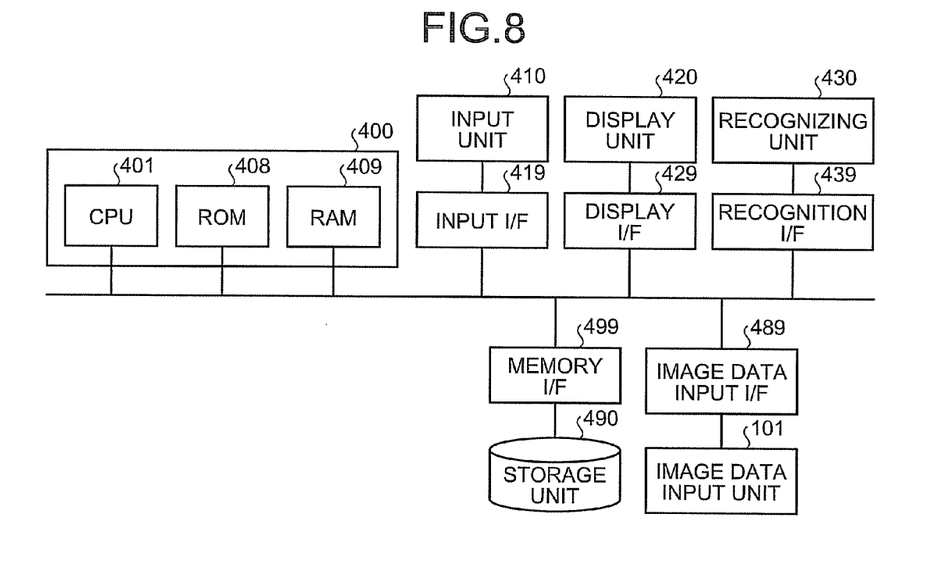
FIG. 8 shows a computer that executes a computer program according to the present embodiment.

FIG. 8 shows an image processing apparatus configured with, for example, a computer that realizes functions of the feature extracting apparatus 100 according to an embodiment of the present invention. The computer shown in FIG. 8 includes, for example, a main processing unit 400, an input unit 410, a display unit 420, a recognizing unit 430, a storage unit 490, the image data input unit 101, an input interface (I/F) 419, a display I/F 429, a recognition I/F 439, a memory I/F 499, and an image data input I/F 489.

The main processing unit 400 realizes the functions of the feature extracting apparatus 100 by causing the computer to execute a computer program (hereinafter, the "program") for performing the processes shown in FIG. 7. The main processing unit 400 includes, for example, a Central Processing Unit (CPU) 401, a Read-Only Memory (ROM) 408, and a Random Access Memory (RAM) 409. The CPU 401 controls various devices included in the computer by executing the program. The ROM 408 stores therein, for example, the program and the parameters and supplies the program and the parameters to the CPU 401. The RAM 409 serves as, for example, a work memory while the CPU 401 executes the program. The RAM 409 may also serve as the image data storage unit 102 shown in FIG. 1.

The input unit 410 is, for example, an input device such as a keyboard and/or a mouse. Instructions to the computer are input to the input unit 410. The display unit 420 displays, for example, results of processes performed by the CPU 401.

The recognizing unit 430 outputs a result of a recognition process indicating, for example, whether an object is included in the image or the type of the object, based on the features of the image data that have been extracted by the feature extracting apparatus 100 according to the preset embodiment.

The input I/F 419, the display I/F 429, the recognition I/F 439, and the image data input I/F 489, and the memory I/F 499 respectively serve as interfaces when the input unit 410, the display unit 420, the recognizing unit 430, the image data input unit 101, and the storage unit 490 are connected to the main processing unit 400 via a bus.

The image data that is processed by the feature extracting apparatus 100 according to the present embodiment is, for example, obtained by the image data input unit 101 or input to the feature extracting apparatus 100 from the outside thereof via a network. Thus, the image processing apparatus according to the present embodiment may include the image data input unit 101 or may be connected to an external image data input unit in such a manner that communication is allowed therebetween. Another arrangement is acceptable in which the image data processed by the feature extracting apparatus 100 according to the present embodiment is read from, for example, a computer-readable storage medium inserted in a driving device (not shown), or the storage unit 490.

The features of the image data that have been extracted by the feature extracting apparatus 100 according to the present embodiment are output from, for example, the display unit 420 or a network. Alternatively, the features of the image data that have been extracted by the feature extracting apparatus 100 according to the present embodiment may be, for example, recorded onto a compute-readable storage medium inserted in a driving unit or recorded into the storage unit 490. The features of the image data that have been extracted by the feature extracting apparatus 100 according to the present embodiment may be input to, for example, the recognizing unit 430. The output of the recognizing unit 430 is output via, for example, the display unit 420 or a network. Alternatively, the output of the recognizing unit 430 may be, for example, recorded onto a computer-readable storage medium inserted in a driving unit.

Instead of being stored in storage devices such as the ROM 408 and the storage unit 490, the program for the feature extracting apparatus 100 shown in FIG. 1 may be recorded onto a computer-readable storage medium such as a compact disk (CD) or a Digital Versatile Disk (DVD) so that, when the computer-readable storage medium is inserted into a driving unit, the computer reads and executes the program.

According to the present embodiment, an affine transformation is used as the mapping process for calculating the co-occurrence matrix. Thus, it is possible to express not only parallel translations but also other various linear mapping processes such as left-right inversion, rotations, and enlargements/reductions. As a result, it is possible to improve the level of recognition performance for objects having features that cannot be expressed with parallel translations. Examples of the features that cannot be expressed with parallel translations include left-right symmetricity of a person and identical properties in rotations of tires of an automobile. In addition, it is also possible to improve, similarly, the level of recognition performance for objects that can be locally expressed with parallel translations.

Further, according to the present embodiment, even if co-occurrence is partial, it is possible to extract pixel features by setting areas in the image and calculating a co-occurrence matrix for each of the set areas. With this arrangement, even in the case where there is co-occurrence in a map of a partial area of an image, it is possible to extract the partial co-occurrence that has a possibility of submerging in a co-occurrence calculation for the entire image because the size of the area is too small in relation to the size of the entire image.

Furthermore, according to the present embodiment, by combining a plurality of areas and a plurality of mapping processes, it is possible to extract, as the co-occurrence features, the relationships with the outside of the areas, which cannot be expressed when only the inside of the areas is used, as well as the relationships with a plurality of coordinates, which cannot be expressed when a single mapping process is used. Consequently, it is possible to express shapes of objects in detail.

By performing a recognition process on the images using the pixel features that have been extracted in this manner, it is possible to recognize the image more properly.

According to an aspect of the present invention, it is possible to extract, from image data, features that are effective in recognition of an object having few repeatedly-appearing patterns.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A feature extracting apparatus, comprising:
   a pixel feature calculator configured to calculate a pixel feature for each pixel of image data;
   an area setting unit configured to set a plurality of areas in the image data;
   a coordinate mapping unit configured to map a first coordinate in one of the plurality of areas onto a second coordinate in at least one of the other plurality of areas; and
   a co-occurrence matrix calculator configured to calculate a co-occurrence matrix for each of the plurality of areas, the co-occurrence matrix being frequency of a combination of the pixel feature at the first coordinate and the pixel feature at the second coordinate.

2. The apparatus according to claim 1, wherein
   the coordinate mapping unit maps the first coordinate onto the second coordinate in each of two or greater of the plurality of areas, and
   the co-occurrence matrix calculator calculates the cooccurrence matrix, the co-occurrence matrix being the frequency of the combinations of the pixel features at the two or greater mappings.

3. The apparatus according to claim 1, wherein
   the pixel feature calculator calculates a plurality of pixel features, and
   the co-occurrence matrix calculator calculates the cooccurrence matrix using the pixel features.

4. The apparatus according to claim 1, wherein the mapping performed by the coordinate mapping unit includes one of, or a combination of two or greater of a parallel translation, a rotation, and a symmetric transformation, as well as an affine transformation.

5. The apparatus according to claim 1, wherein the pixel feature calculator outputs a luminance gradient direction of each pixel as the pixel feature.

6. An image processing apparatus, comprising:
an input unit configured to input the image data; and
the feature extracting apparatus according to claim 1.

7. A computer-implemented feature extracting method, comprising:
- calculating by a pixel feature calculator a pixel feature for each pixel of image data;
- setting by an area setting unit a plurality of areas in the image data;
- mapping by a coordinate mapping unit a first coordinate in one of the plurality of areas onto a second coordinate in at least one of the other plurality of areas; and
- calculating by a co-occurrence matrix calculator a co-occurrence matrix for each of the plurality of areas, the co-occurrence matrix being frequency of a combination of the pixel feature at the first coordinate and the pixel feature at the second coordinate.

8. A computer program stored on a computer-readable storage medium for causing a computer to perform an instruction, the instruction comprising:
- calculating a pixel feature for each pixel of image data;
- setting a plurality of areas in the image data;
- mapping a first coordinate in one of the plurality of areas onto a second coordinate in at least one of the other plurality of areas; and
- calculating a co-occurrence matrix for each of the plurality of areas, the co-occurrence matrix being frequency of a combination of the pixel feature at the first coordinate and the pixel feature at the second coordinate.

* * * * *